UNITED STATES PATENT OFFICE.

WILLIAM H. BARKWILL, OF AKRON, OHIO.

MILLING-MACHINE.

1,308,029.   Specification of Letters Patent.   Patented July 1, 1919.

Application filed April 19, 1918. Serial No. 229,494.

*To all whom it may concern:*

Be it known that I, WILLIAM H. BARKWILL, a citizen of the United States, residing at Akron, in the county of Summit and State of Ohio, have invented a certain new and useful Improvement in Milling-Machines, of which the following is a full, clear, and exact description.

This invention relates to a milling machine adapted particularly for making rubber molds and for die sinking purposes, and has for its principal object to provide an efficient milling machine having proper provision for driving, supporting and adjusting the spindle designed to carry the milling tool.

My invention may be briefly summarized as consisting in certain novel details of construction and combinations and arrangements of parts which will be described in the specification and set forth in the appended claims.

Figure 1:
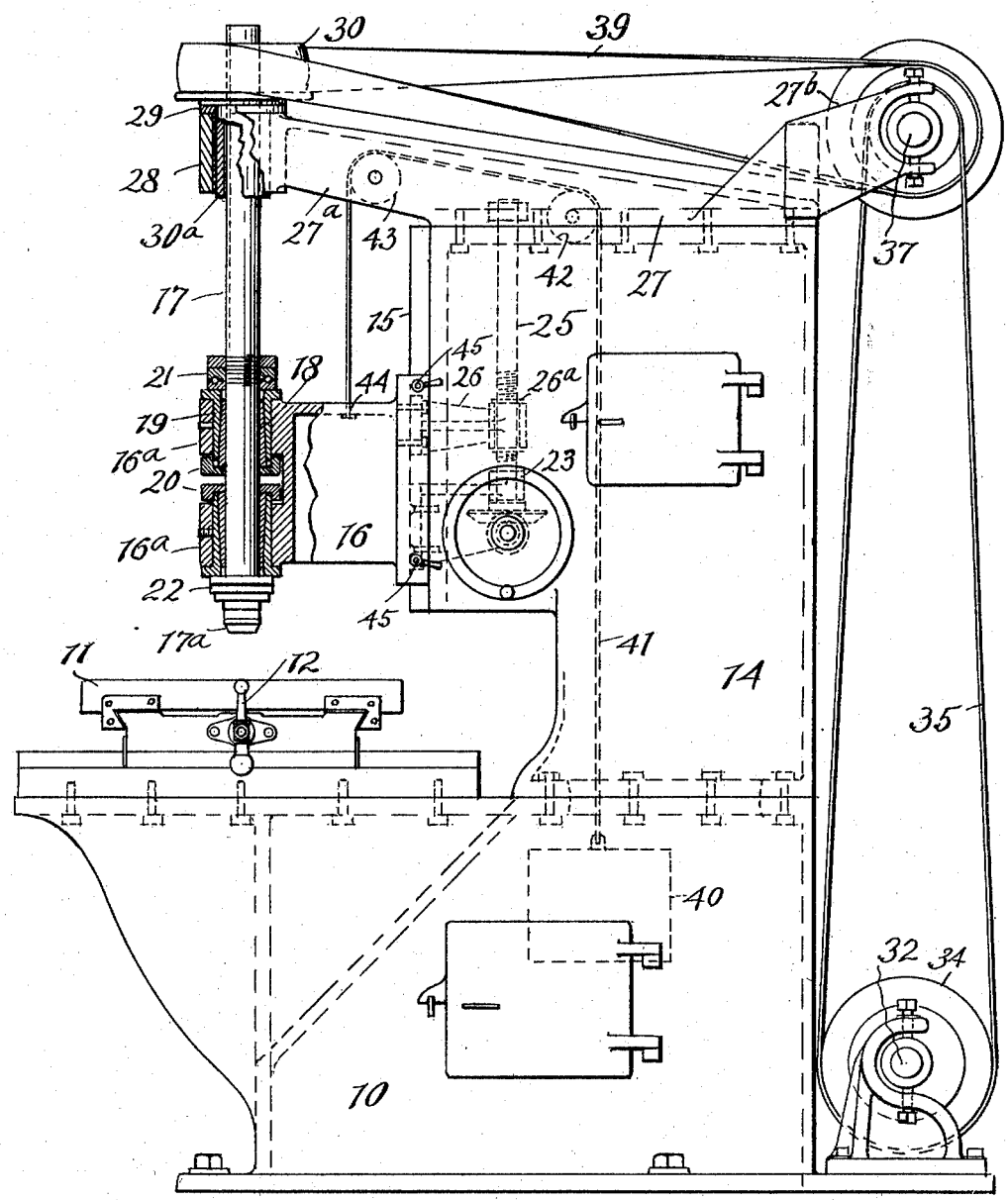
Figure 2:
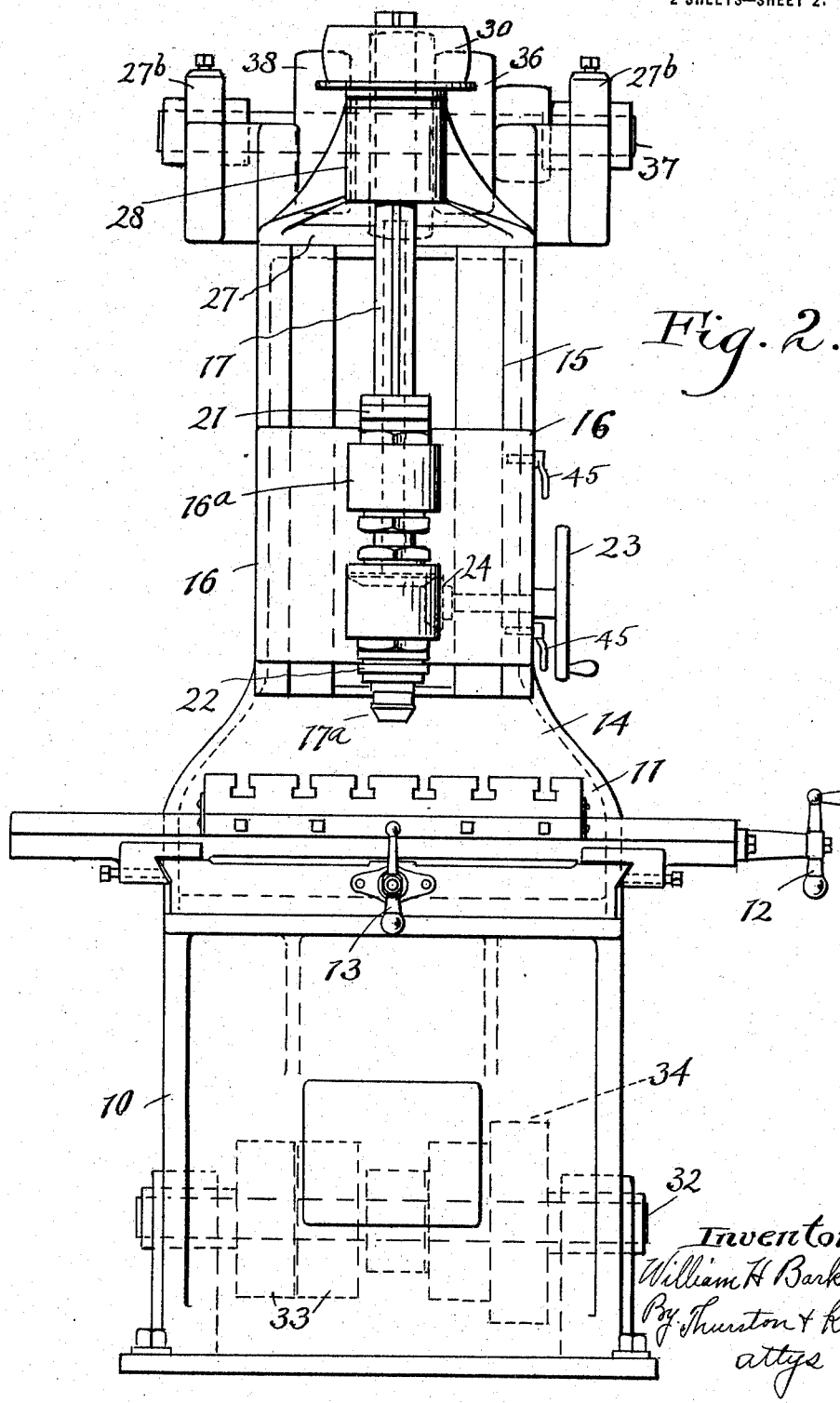

In the accompanying sheet of drawings, Figure 1 is a side view of the machine involving my invention, parts being in section; and Fig. 2 is a front view of the same.

The machine includes a suitable base 10, on a portion of which is mounted a table 11 which supports the work. This table is adapted to be adjusted laterally by turning a hand wheel 12, to be adjusted inward and outward by turning a hand wheel 13. This table is not adjustable vertically as is generally the case with milling machines designed for the special purpose above mentioned.

At the rear of the table 11 is a hollow standard 14 at the front of which there is a vertical guideway 15 for a vertically adjustable head 16 having two bearing bosses 16ª for supporting the vertical rotary spindle 17 at the lower end of which is a chuck 17ª to receive the milling tool.

This spindle 17 rotates in split bronze bearings 18 which are exteriorly tapered and engage in tapered steel bearing sleeves 19 which are seated in the bearing bosses 16ª. The inner split bearings 18 may be adjusted by turning screw caps 20 engaging the ends of the sleeves 19.

The spindle 17 is held from endwise movement relative to the head 16 by end thrust bearings 21 and 22 above and below the bearing bosses 16ª, each of these bearings including a stationary disk and a disk which rotates with the spindle, these disks having ball races receiving ball bearings.

The head and spindle 17 may be adjusted vertically by a hand wheel 23 at one side of the standard 14. This hand wheel through a short shaft and bevel gearing indicated at 24 in Fig. 2, is designed to rotate a vertical threaded shaft or screw 25 mounted in suitable bearings in the front part of the standard just to the rear of the head 16. Secured to the head 16 is a rearwardly extending bracket 26 carrying at its rear end a nut 26ª which engages the screw 25, in consequence of which the head will move vertically when the hand wheel is turned.

Secured to the top of the standard 14 is a cap 27 which is provided with a forwardly and upwardly projecting arm 27ª having at its forward upper end a bearing boss 28 which is directly above the bearing bosses 16ª of the head 16. Supported on this bearing boss 28 through a suitable thrust bearing 29 is a spindle driving member 30 having a depending sleeve 30ª which extends down into and has a bearing in the bearing boss 28. The spindle driving member 30 is not fixed to the spindle 17 but is connected thereto by a double key-way which will allow the spindle to be raised and lowered relative to the member 30, but nevertheless rotation of the latter will rotate the spindle.

The shape or form of the driving member 30 will depend upon the type of drive for the spindle, and while more than one type of drive may be employed as is obvious, I prefer the pulley and belt drive, and for that reason the driving member 30 is here shown as a pulley.

The pulley 30 and spindle 17 are rotated by the following mechanism. At the bottom of the machine and at the rear of the base there is a horizontal countershaft 32 carrying tight and loose pulleys 33 (see Fig. 2) and also carrying a stepped pulley 34 which through a belt 35 drives a similar stepped pulley 36 mounted on a second countershaft 37 also disposed in horizontal position but located at the top of the machine at the rear of the forward spindle-driving pulley 30. The shaft 37 is supported in a hanger 27ᵇ which projects rearwardly from and is integral with the cap 27 which also has as an integral part thereof, the arm 27ª as before stated. By these two stepped pulleys 34 and 36 the relative speeds of the two shafts 32 and 37 may be varied. Just beyond the stepped pulley 36 on shaft 37 there is a pulley 38 which through a belt 39 (see Fig. 1) transmits power from the horizontal countershaft 37 to the pulley 30 which drives the vertical spindle 17.

The drive is simple, and at the same time the spindle is very effectively supported in the fixed arm 27ª and the vertically adjustable head 16, but nevertheless the head can be moved vertically, at which time the lower vertically movable spindle bearing parts move toward and from the relatively fixed bearing parts at the outer end of the arm 27ª, it being understood that the spline or key-way connection between the pulley 30 and spindle allows the spindle to move upwardly or downwardly through the pulley 30 when this adjustment takes place.

In order that the adjustment of the head may be effected with ease, the head is counterweighted by means of a counterweight 40, to which is connected a chain or cable 41 which passes upwardly around fixed sheaves 42 and 43, and then downwardly to the head to which it is connected as shown at 44.

The head may be locked in any adjusted position by locking devices 45 shown in Figs. 1 and 2.

With this machine having a spindle, driven, supported, and adjusted as described, very accurate work can be done as is required in making molds and in sinking dies.

Having described my invention, I claim:

1. In a milling machine, a bed, an upstanding standard thereon provided with a guide-way, a head engaging said guide-way and mounted for vertical movement, a bearing at the front of said head and movable with said head, a fixed bearing supported at the top of said standard and directly above the bearing carried by the movable head, a spindle driving member rotatably supported in said bearing, and a vertical rotary spindle journaled in the bearing of said head and in said upper spindle-driving member and having a key-way connection with the latter.

2. In a machine of the character described, a bed having an upstanding standard which is provided with a guide-way, a head vertically adjustable on said guide-way and provided at the front thereof with spindle bearings one disposed above the other, and both movable vertically with the head, an arm projecting forwardly from the top of the standard and provided with a fixed bearing directly above the lower movable bearings, a spindle-driving member supported by said upper fixed bearing, a rotary spindle journaled in said lower bearings and in said spindle-driving member and having a sliding connection with the latter, end thrust bearings by which the spindle is constrained to move vertically with the head and lower bearings, and means for rotating said spindle-driving member.

3. In a machine of the character described, a bed having a work supporting table and having an upstanding standard provided with a guide-way, a head vertically adjustable on said guide-way, a bearing at the front of said head, a rigid forward extension at the top of the standard and provided at its forward end with a fixed bearing directly above the lower bearing, a pulley supported in said fixed bearing, a rotary vertical spindle supported in said lower bearing and in said pulley and having a key-way connection with the latter, means for constraining the spindle to move vertically with said head and the bearing supported thereby, whereby the spindle will slide through the pulley, and means for driving the pulley.

4. In a machine of the character described, a bed having a work supporting table and having an upstanding standard provided with a guide-way, a head vertically adjustable on said guide-way, a bearing at the front of said head, a rigid forward extension at the top of the standard and provided at its forward end with a fixed bearing directly above the lower bearing, a pulley supported in said fixed bearing, a rotary vertical spindle supported in said lower bearing and in said pulley and having a key-way connection with the latter, means for constraining the spindle to move vertically with said head and the bearing supported thereby, whereby the spindle will slide through the pulley, and means for driving the pulley, said means comprising a countershaft provided with pulleys supported at the upper rear part of the standard, and belts for transmitting power to said countershaft and from the latter to said first-named pulley.

In testimony whereof, I hereunto affix my signature.

WILLIAM H. BARKWILL.